US011543298B1

(12) United States Patent
Chang et al.

(10) Patent No.: US 11,543,298 B1
(45) Date of Patent: Jan. 3, 2023

(54) TEMPERATURE CALIBRATION METHOD FOR A TEMPERATURE MEASURING DEVICE

(71) Applicant: RADIANT INNOVATION INC., Hsinchu County (TW)

(72) Inventors: Yung-Chang Chang, Hsinchu County (TW); Feng-Lien Huang, Hsinchu (TW); Chien-Wen Huang, Hsinchu County (TW); Yi-Chun Tsai, Hsinchu County (TW); Po-Hung Chen, Taichung (TW)

(73) Assignee: RADIANT INNOVATION INC., Hsinchu County (TW)

( * ) Notice: Subject to any disclaimer, the term of this patent is extended or adjusted under 35 U.S.C. 154(b) by 0 days.

(21) Appl. No.: 17/501,030

(22) Filed: Oct. 14, 2021

(51) Int. Cl.
*G01J 5/53* (2022.01)
*G01J 5/00* (2022.01)
*G01J 5/80* (2022.01)

(52) U.S. Cl.
CPC . *G01J 5/53* (2022.01); *G01J 5/80* (2022.01); *G01J 2005/0077* (2013.01)

(58) Field of Classification Search
CPC ......... G01J 5/53; G01J 5/80; G01J 2005/0077
See application file for complete search history.

(56) References Cited

U.S. PATENT DOCUMENTS 10,386,241 B1 * 8/2019 Staple ................. G01J 5/10

* cited by examiner

*Primary Examiner* — Hugh Maupin
(74) *Attorney, Agent, or Firm* — Li & Cai Intellectual Property (USA) Office

(57) ABSTRACT

A temperature calibration method includes providing a temperature measuring device including a movable shutter module, and a first and a second non-contacting temperature sensing module, and a movable shutter structure of the movable shutter module includes a black substance for generating a predetermined heating temperature; moving the movable shutter structure to a first position by driving of the electric control driver, so as to completely block a first temperature-measuring viewing angle of the first non-contacting temperature sensing module and a second temperature-measuring viewing angle of the second non-contacting temperature sensing module by the black substance; measuring the predetermined heating temperature that is generated by the black substance by the second non-contacting temperature sensing module at the second temperature-measuring viewing angle so as to obtain black body temperature information of the black substance; and calibrating the first non-contacting temperature sensing module according to the black body temperature information.

9 Claims, 17 Drawing Sheets

TEMPERATURE CALIBRATION METHOD FOR A TEMPERATURE MEASURING DEVICE

FIELD OF THE DISCLOSURE

The present disclosure relates to a temperature calibration method, and more particularly to a temperature calibration method for a temperature measuring device.

BACKGROUND OF THE DISCLOSURE

In the related art, an infrared thermal image camera can be calibrated by a temperature calibration method using a temperature calibration tool such as a fixed black body, but the conventional temperature calibration tool and the temperature calibration method still have room for improvement.

SUMMARY OF THE DISCLOSURE

In response to the above-referenced technical inadequacy, the present disclosure provides a temperature calibration method for a temperature measuring device.

In one aspect, the present disclosure provides a temperature calibration method, which includes: providing a temperature measuring device, in which the temperature measuring device includes a movable shutter module, a first non-contacting temperature sensing module having a first temperature-measuring viewing angle, a second non-contacting temperature sensing module having a second temperature-measuring viewing angle, the movable shutter module includes an electric control driver, a movable shutter structure connected to the electric control driver, and an electric control heater disposed on the movable shutter structure, and the movable shutter structure includes a black substance for generating a predetermined heating temperature from being heated by the electric control heater; moving the movable shutter structure to a first position by driving of the electric control driver, so as to completely block the first temperature-measuring viewing angle of the first non-contacting temperature sensing module and the second temperature-measuring viewing angle of the second non-contacting temperature sensing module by the black substance of the movable shutter structure; measuring the predetermined heating temperature that is generated by the black substance of the movable shutter structure by the second non-contacting temperature sensing module at the second temperature-measuring viewing angle so as to obtain black body temperature information of the black substance; and calibrating the first non-contacting temperature sensing module according to the black body temperature information that is obtained by the second non-contacting temperature sensing module.

In another aspect, the present disclosure provides a temperature calibration method, which includes: providing a temperature measuring device, in which the temperature measuring device includes a first non-contacting temperature sensing module having a first temperature-measuring viewing angle, and a second non-contacting temperature sensing module having a second temperature-measuring viewing angle; measuring a predetermined heating temperature that is generated by a black substance by the second non-contacting temperature sensing module at the second temperature-measuring viewing angle so as to obtain black body temperature information of the black substance; and calibrating the first non-contacting temperature sensing module according to the black body temperature information that is obtained by the second non-contacting temperature sensing module.

In yet another aspect, the present disclosure provides a temperature calibration method, which includes: providing a temperature measuring device, in which the temperature measuring device includes a movable shutter module, and a first non-contacting temperature sensing module having a first temperature-measuring viewing angle, the movable shutter module includes an electric control driver, a movable shutter structure connected to the electric control driver, and an electric control heater disposed on the movable shutter structure, and the movable shutter structure includes a black substance for generating a predetermined heating temperature from being heated by the electric control heater; moving the movable shutter structure to a first position by driving of the electric control driver, so as to completely block the first temperature-measuring viewing angle of the first non-contacting temperature sensing module by the black substance of the movable shutter structure; measuring the predetermined heating temperature that is generated by the black substance of the movable shutter structure by the first non-contacting temperature sensing module at the first temperature-measuring viewing angle so as to obtain black body temperature information of the black substance; and calibrating the first non-contacting temperature sensing module according to the black body temperature information that is obtained by the first non-contacting temperature sensing module.

Therefore, in the temperature measuring device provided by the present disclosure, by virtue of "moving the movable shutter structure to a first position by driving of the electric control driver, so as to completely block the first temperature-measuring viewing angle of the first non-contacting temperature sensing module and the second temperature-measuring viewing angle of the second non-contacting temperature sensing module by the black substance of the movable shutter structure" and "measuring the predetermined heating temperature that is generated by the black substance of the movable shutter structure by the second non-contacting temperature sensing module at the second temperature-measuring viewing angle so as to obtain black body temperature information of the black substance", the first non-contacting temperature sensing module can be calibrated according to the black body temperature information that is obtained by the second non-contacting temperature sensing module.

Moreover, in the temperature measuring device provided by the present disclosure, by virtue of "measuring a predetermined heating temperature that is generated by a black substance by the second non-contacting temperature sensing module at the second temperature-measuring viewing angle so as to obtain black body temperature information of the black substance", the first non-contacting temperature sensing module can be calibrated according to the black body temperature information that is obtained by the second non-contacting temperature sensing module.

Furthermore, in the temperature measuring device provided by the present disclosure, by virtue of "moving the movable shutter structure to a first position by driving of the electric control driver, so as to completely block the first temperature-measuring viewing angle of the first non-contacting temperature sensing module by the black substance of the movable shutter structure" and "measuring the predetermined heating temperature that is generated by the black substance of the movable shutter structure by the first non-contacting temperature sensing module at the first temperature-measuring viewing angle so as to obtain black body temperature information of the black substance", the first non-contacting temperature sensing module can be calibrated according to the black body temperature information that is obtained by the first non-contacting temperature sensing module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
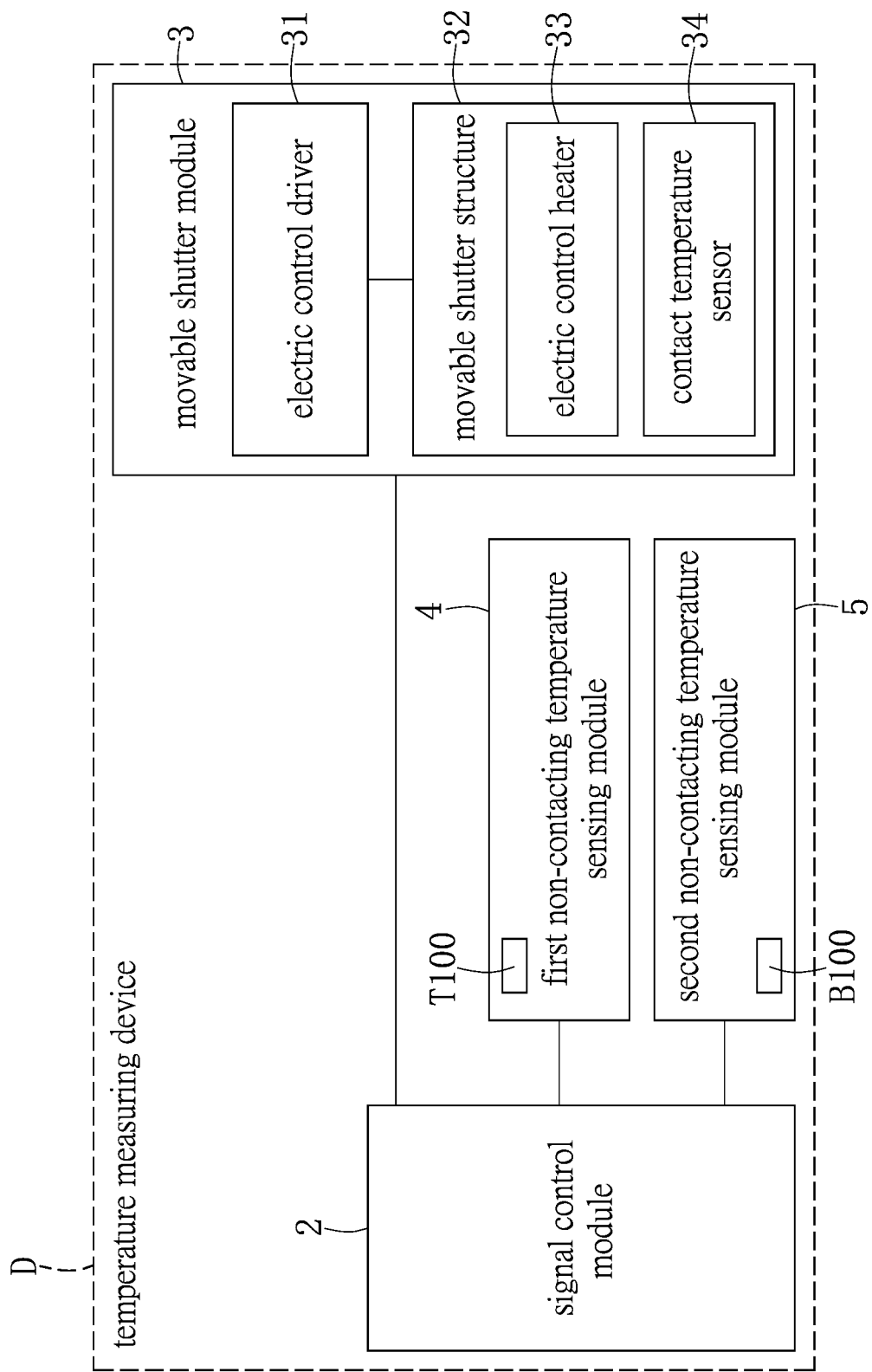
FIG. 1 is a functional block diagram of a temperature measuring device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 7, a first embodiment of the present disclosure provides a temperature measuring device D having a temperature calibration (or correction) function, which includes a device main body 1, a signal control module 2, a movable shutter module 3, a first non-contacting temperature sensing module 4, and a second non-contacting temperature sensing module 5.

More particularly, referring to FIG. 1, FIG. 2, FIG. 3 and FIG. 5, the signal control module 2 is disposed inside the device main body 1, and the movable shutter module 3 is disposed inside the device main body 1 and electrically connected to the signal control module 2. In addition, the movable shutter module 3 includes an electric control driver 31, a movable shutter structure 32 connected to the electric control driver 31, and an electric control heater 33 disposed on the movable shutter structure 32, and the movable shutter structure 32 includes a black substance B (such as an inner black body) for generating a predetermined heating temperature (or black body radiation) from being heated by the electric control heater 33. Moreover, the first non-contacting temperature sensing module 4 is disposed inside the device main body 1 and electrically connected to the signal control module 2, and the first non-contacting temperature sensing module 4 can be configured for measuring an object temperature of an object T (such as an object to be tested, or a prepared object for testing) so as to obtain object temperature information T100 of the object T. Furthermore, the second non-contacting temperature sensing module 5 is disposed inside the device main body 1 and electrically connected to the signal control module 2, and the second non-contacting temperature sensing module 5 can be configured for measuring the predetermined heating temperature (or black body radiation) that is generated by the black substance B of the movable shutter structure 32 so as to obtain black body temperature information B100 of the black substance B. Therefore, after the black body temperature information B100 of the black substance B is obtained by the second non-contacting temperature sensing module 5, the first non-contacting temperature sensing module 4 can be calibrated (or corrected) according to the black body temperature information B100 that is obtained by the second non-contacting temperature sensing module 5.

Figure 3:
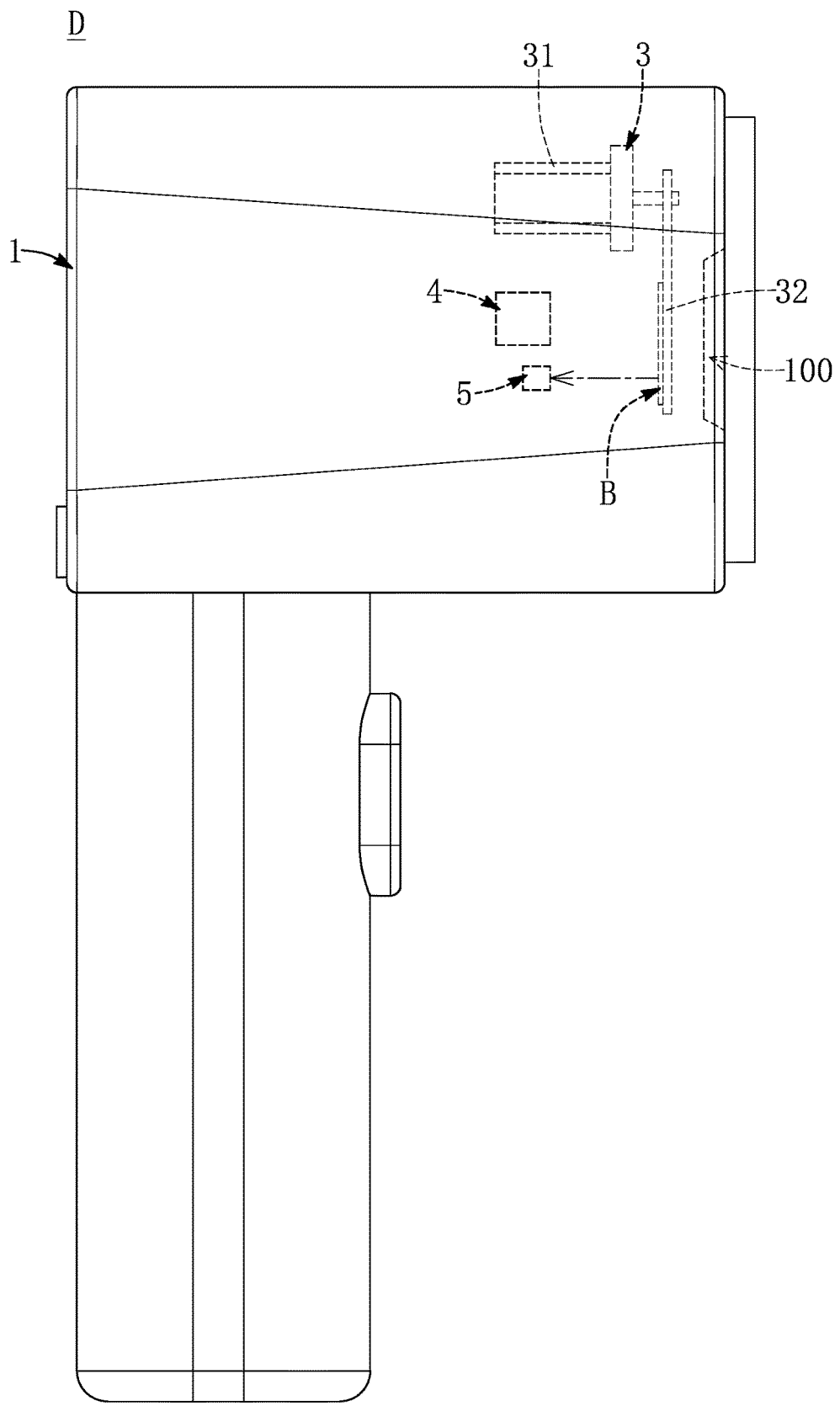
FIG. 3 is a schematic side view of a movable shutter structure of the temperature measuring device being moved to a first position according to the first embodiment of the present disclosure.
Figure 4:
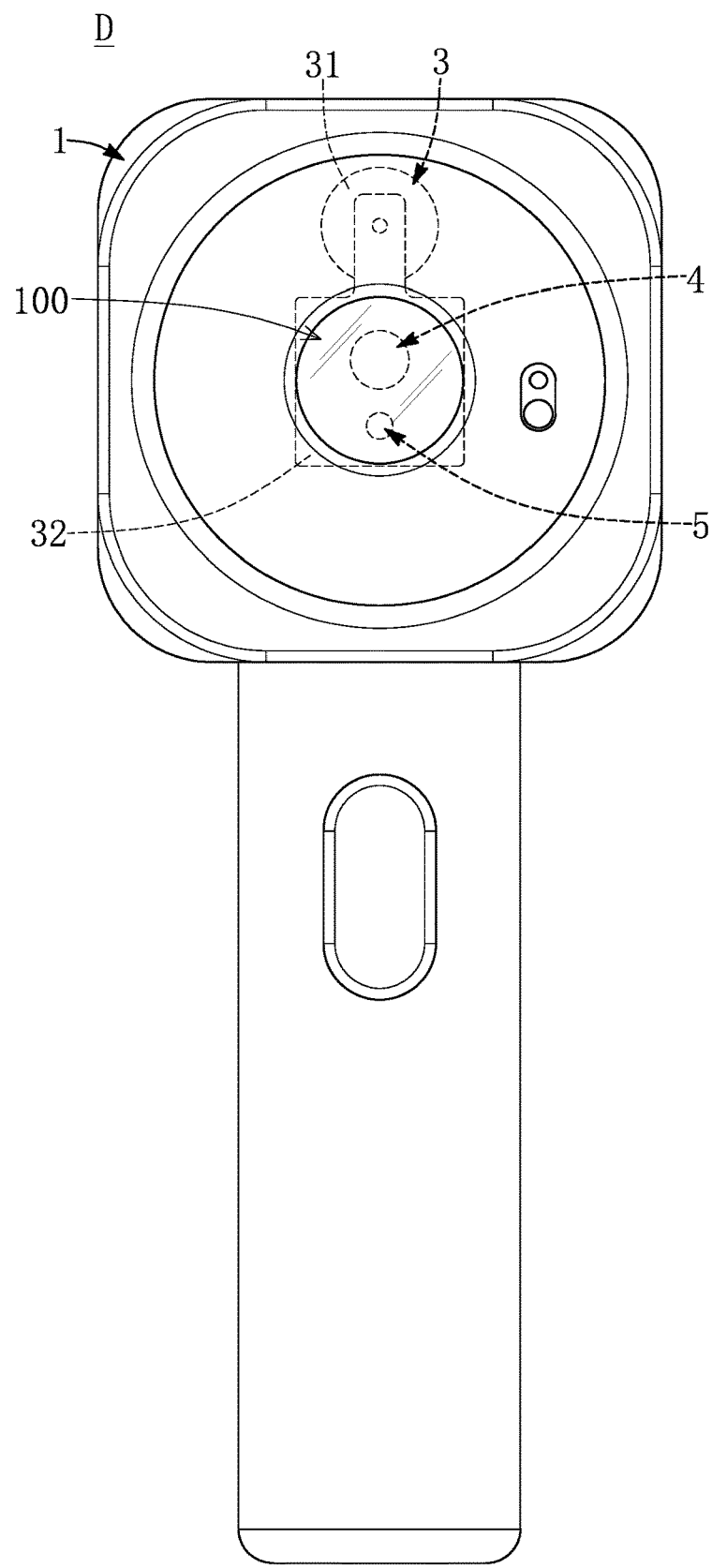
FIG. 4 is a schematic front view of the movable shutter structure of the temperature measuring device being moved to the first position according to the first embodiment of the present disclosure.

For example, referring to FIG. 1, FIG. 3 and FIG. 4, when the movable shutter structure 32 is driven by the electric control driver 31 to move to a first position (such as the position of the movable shutter structure 32 as shown in FIG. 3 and FIG. 4), a first temperature-measuring viewing angle (such as a first field of view (FOV) or a first temperature-measuring range for measuring temperature) of the first non-contacting temperature sensing module 4 and a second temperature-measuring viewing angle (such as a second field of view (FOV) or a second temperature-measuring range for measuring temperature) of the second non-contacting temperature sensing module 5 can be completely blocked by the black substance B of the movable shutter structure 32, so that the predetermined heating temperature generated by the black substance B of the movable shutter structure 32 can be measured by the second non-contacting temperature sensing module 5 at the second temperature-measuring viewing angle so as to obtain the black body temperature information B100 of the black substance B. Hence, the black body temperature information B100 obtained by the second non-contacting temperature sensing module 5 can be configured for calibrating (or correcting) the first non-contacting temperature sensing module 4. However, the aforementioned description is merely an example, and is not meant to limit the scope of the present disclosure.

Figure 5:
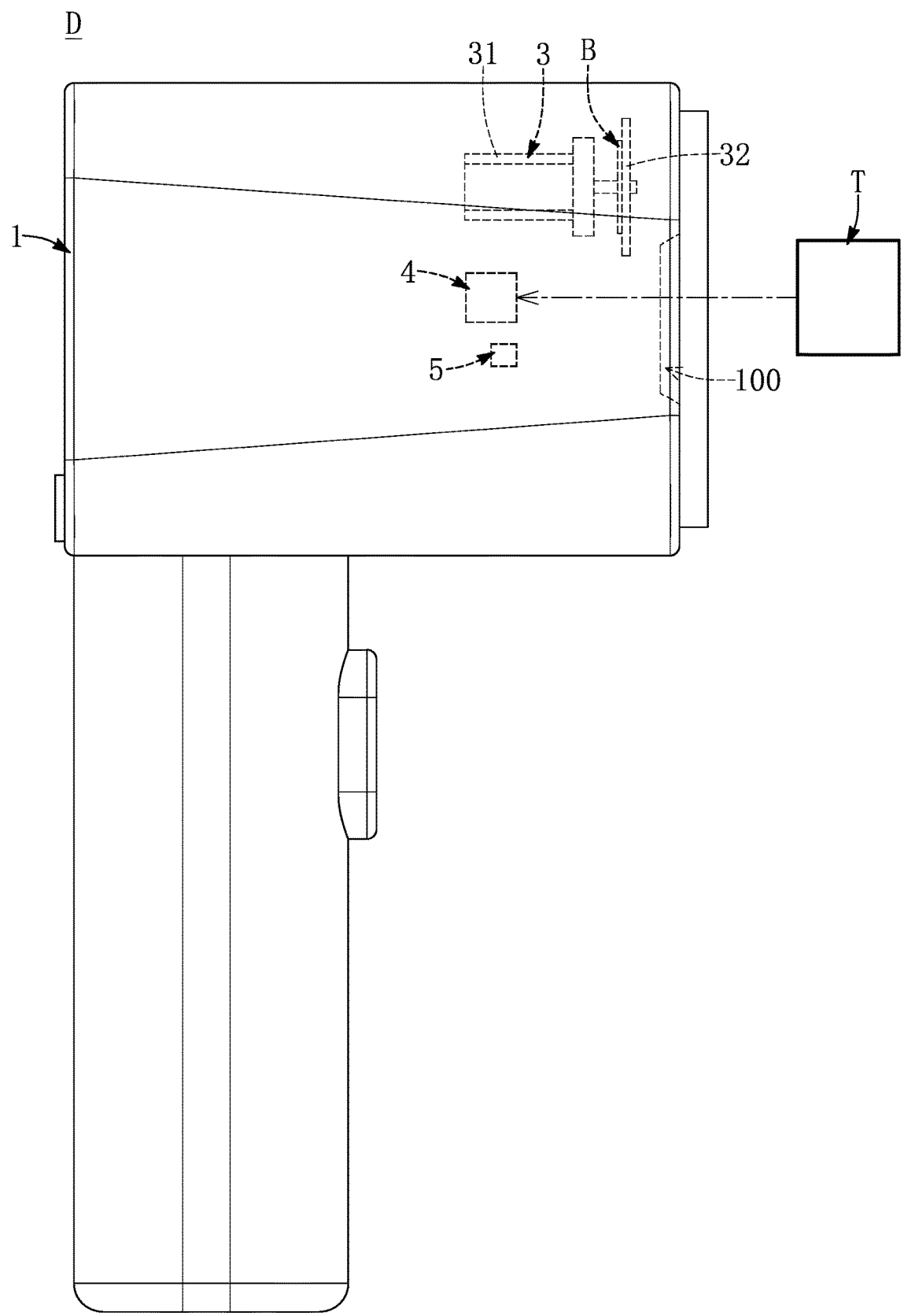
FIG. 5 is a schematic side view of the movable shutter structure of the temperature measuring device being moved to a second position according to the first embodiment of the present disclosure.
Figure 6:
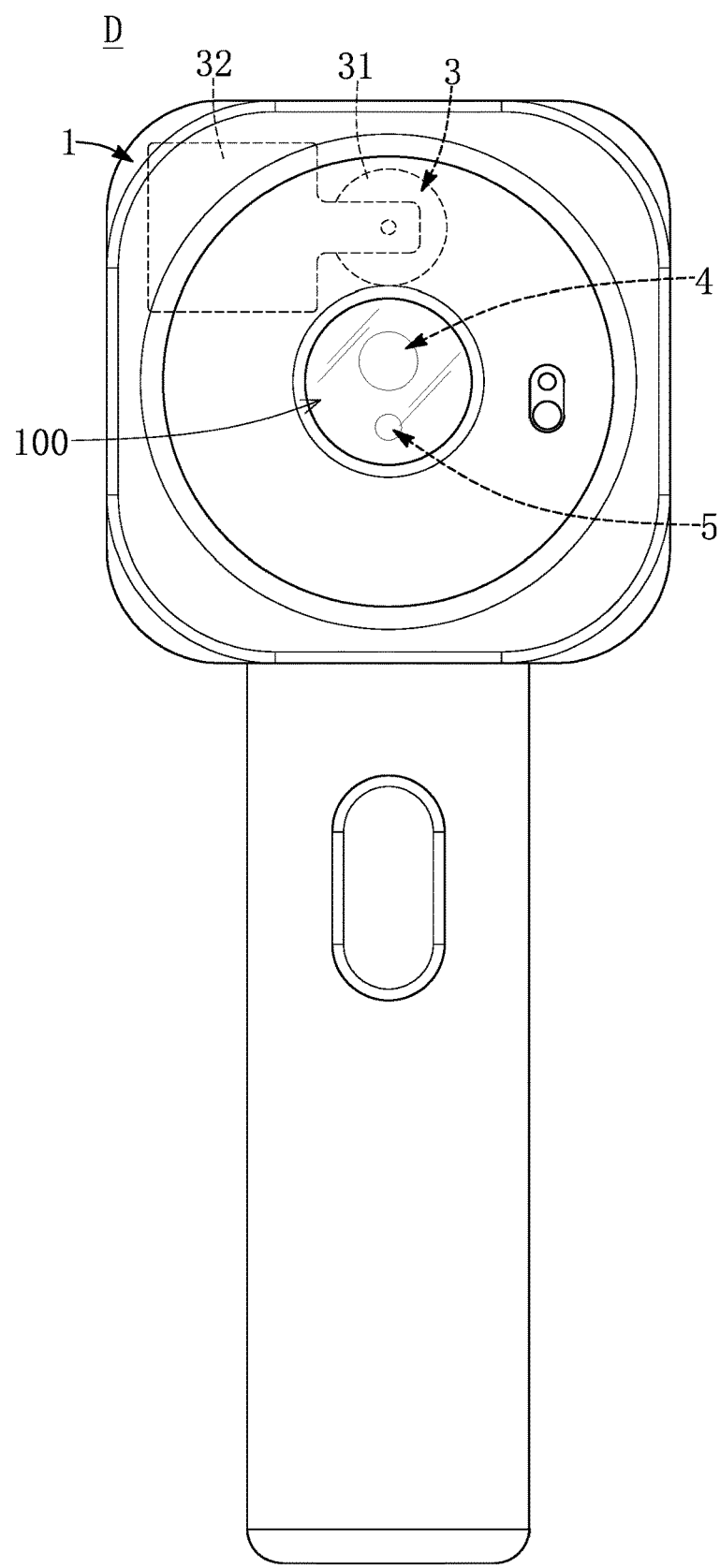
FIG. 6 is a schematic front view of the movable shutter structure of the temperature measuring device being moved to the second position according to the first embodiment of the present disclosure.

For example, referring to FIG. 1, FIG. 5 and FIG. 6, when the movable shutter structure 32 is driven by the electric control driver 31 to move to a second position (such as the position of the movable shutter structure 32 as shown in FIG. 5 and FIG. 6), the first temperature-measuring viewing angle of the first non-contacting temperature sensing module 4 and the second temperature-measuring viewing angle of the second non-contacting temperature sensing module 5 can be completely exposed by the black substance B of the movable shutter structure 32, so that the object temperature of the object T can be measured by the first non-contacting temperature sensing module 4 at the first temperature-measuring viewing angle so as to obtain the object temperature information T100 of the object T. However, the aforementioned description is merely an example, and is not meant to limit the scope of the present disclosure.

It should be noted that, for example, in another embodiment, the black substance B of the movable shutter structure 32 can only block the second temperature-measuring viewing angle of the second non-contacting temperature sensing module 5, so that the first temperature-measuring viewing angle of the first non-contacting temperature sensing module 4 can be perpetually exposed by the black substance B of the movable shutter structure 32. That is to say, no matter where the movable shutter structure 32 is moved, the object temperature of the object T can be measured by the first non-contacting temperature sensing module 4 in a first temperature-measuring viewing angle so as to obtain the object temperature information T100 of the object T. In addition, when the movable shutter structure 32 is driven by the electric control driver 31 to move to a first position, a second temperature-measuring viewing angle of the second non-contacting temperature sensing module 5 is completely blocked by the black substance B of the movable shutter structure 32 (but a first temperature-measuring viewing angle of the first non-contacting temperature sensing module 5 cannot be blocked by the black substance B of the movable shutter structure 32), so that the predetermined heating temperature generated by the black substance B of the movable shutter structure 32 can be measured by the second non-contacting temperature sensing module 5 at the second temperature-measuring viewing angle so as to obtain the black body temperature information B100 of the black substance B. Hence, the black body temperature information B100 obtained by the second non-contacting temperature sensing module 5 can be configured for calibrating the first non-contacting temperature sensing module 4. Moreover, when the movable shutter structure 32 is driven by the electric control driver 31 to move to a second position, the second temperature-measuring viewing angle of the second non-contacting temperature sensing module 5 is completely exposed by the black substance B of the movable shutter structure 32, and the first temperature-measuring viewing angle of the first non-contacting temperature sensing module 4 can also be completely exposed by the black substance B of the movable shutter structure 32, so that the object temperature of the object T can be measured by the first non-contacting temperature sensing module 4 at the first temperature-measuring viewing angle so as to obtain the object temperature information T100 of the object T. However, the aforementioned description is merely an example, and is not meant to limit the scope of the present disclosure.

Figure 2:
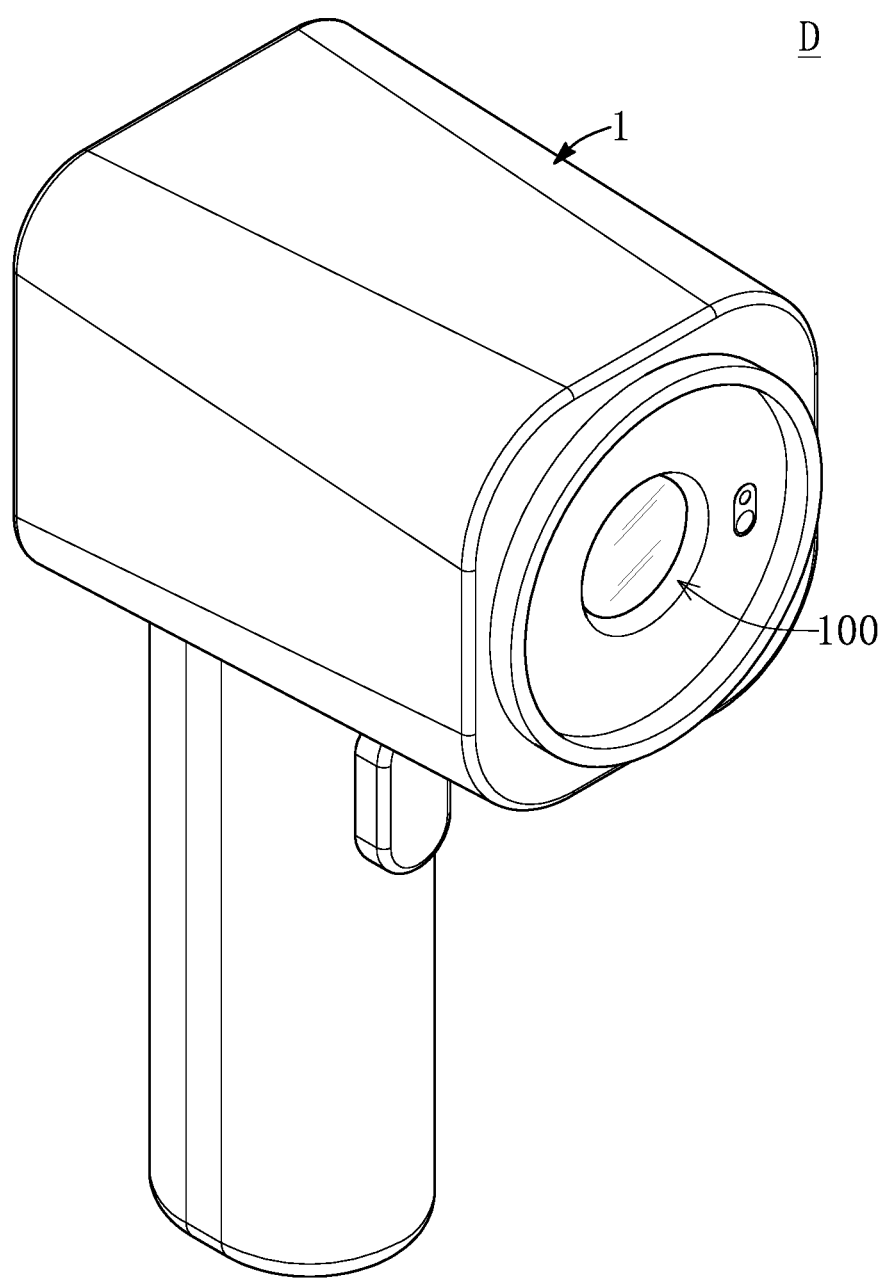
FIG. 2 is a schematic perspective view of the temperature measuring device according to the first embodiment of the present disclosure.
Figure 7:
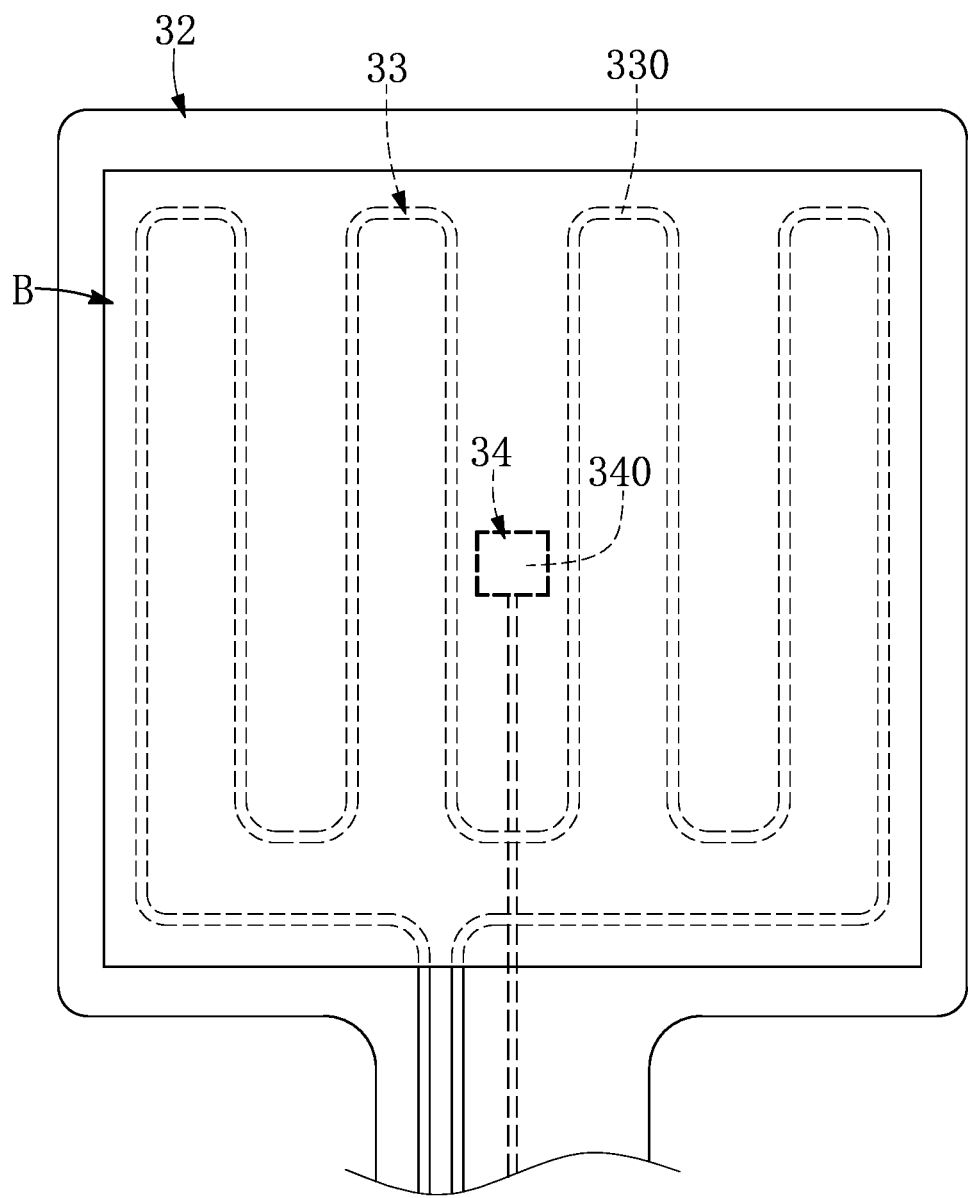
FIG. 7 is a schematic view of a black substance, an electric control heater and a contact temperature sensor of the temperature measuring device according to the first embodiment of the present disclosure.

For example, referring to FIG. 1, FIG. 2 and FIG. 7, the device main body 1 has a measurement opening 100, and the movable shutter structure 32 can be rotated by driving of the electric control driver 31 so as to block (as shown in FIG. 3) or expose (as shown in FIG. 5) the measurement opening 100 of the device main body 1. Moreover, the electric control heater 33 includes a heating coil 330 electrically connected to the signal control module 2, and the heating coil 330 is disposed on the movable shutter structure 32 for directly contacting (or non-directly contacting) and heating the black substance B. In addition, the movable shutter module 3 further includes a contact temperature sensor 34 disposed on the movable shutter structure 32. The contact temperature sensor 34 includes a thermistor 340 electrically connected to the signal control module 2, and the thermistor 340 is disposed on the movable shutter structure 32 for directly contacting (or non-directly contacting) and measuring the black substance B so as to obtain the predetermined heating temperature generated by the black substance B. It should be noted that the black substance B can serve as the whole movable shutter structure 32, or surfaces of the movable shutter structure 32 can be coated, in whole or in part, with the black substance B. In addition, the black substance B can be a small metal black body of a small area (such as a blackened aluminum sheet having an area of 5×5 cm), and has the advantages of rapid heating, uniform heating, and energy saving. However, the aforementioned description is merely an example, and is not meant to limit the scope of the present disclosure.

For example, the first non-contacting temperature sensing module 4 includes a microbolometer for providing a thermal energy distribution image, or any type of thermal imaging camera for capturing a thermal energy distribution image, and the second non-contacting temperature sensing module 5 includes a thermopile sensor for increasing a temperature measurement precision and a temperature measurement stability, or any type of temperature sensor having a property of high measurement precision and high measurement stability. It should be noted that, as shown in FIG. 3, when the black substance B of the movable shutter structure 32 is heated by the electric control heater 33 for generating the predetermined heating temperature, a radiant temperature value (or a radiation temperature value) that is obtained by using the second non-contacting temperature sensing module 5 to measure the predetermined heating temperature generated by the black substance B is greater than or equal to another radiant temperature value that is obtained by using the first non-contacting temperature sensing module 4 to measure the predetermined heating temperature generated by the black substance B. For example, when the black substance B is coated on the movable shutter structure 32 (or the black substance B serves as the whole movable shutter structure 32), the heat radiation efficiency of the predetermined heating temperature generated by the black substance B would decay or be increased due to abrasion of the black substance B from long-time use, so that a radiant temperature value that is obtained by using the thermopile sensor to measure the black substance B is greater than or equal to another radiant temperature value that is obtained by using the microbolometer to measure the black substance B. However, the aforementioned description is merely an example, and is not meant to limit the scope of the present disclosure.

Figure 8:
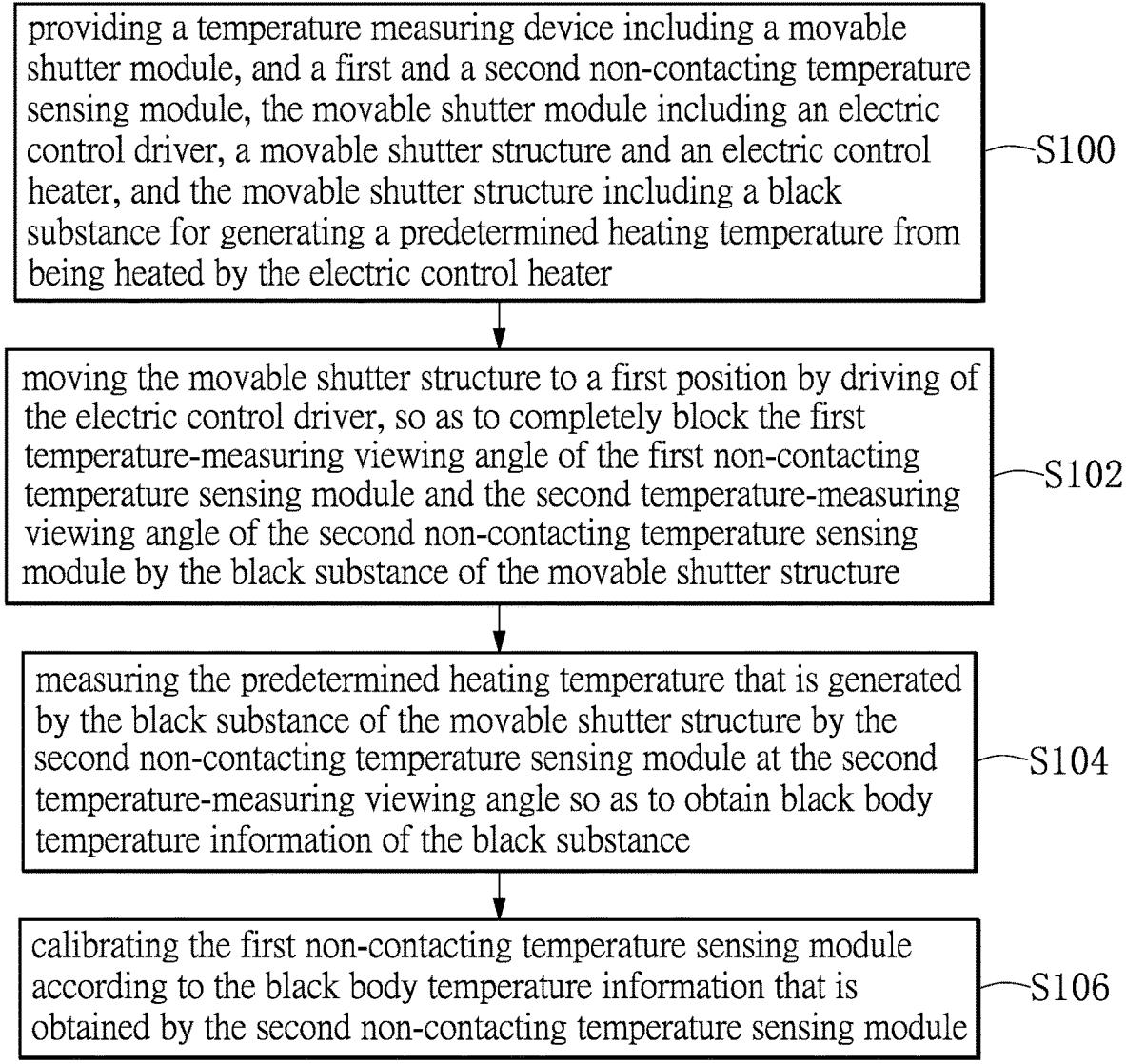
FIG. 8 is a flowchart of a temperature calibration method according to the first embodiment of the present disclosure.

It should be noted that, referring to FIG. 1 to FIG. 8, the first embodiment of the present disclosure further provides a temperature calibration method, which includes: firstly, referring to FIG. 1, FIG. 7 and FIG. 8, providing a temperature measuring device D, in which the temperature measuring device D includes a movable shutter module 3, a first non-contacting temperature sensing module 4 having a first temperature-measuring viewing angle, a second non-contacting temperature sensing module 5 having a second temperature-measuring viewing angle, the movable shutter module 3 includes an electric control driver 31, a movable shutter structure 32 connected to the electric control driver 31, and an electric control heater 33 disposed on the movable shutter structure 32, and the movable shutter structure 32 includes a black substance B for generating a predetermined heating temperature from being heated by the electric control heater 33 (step S100); next, referring to FIG. 3, FIG. 4 and FIG. 8, moving the movable shutter structure 32 to a first position (such as the position of the movable shutter structure 32 as shown in FIG. 3 and FIG. 4) by driving of the electric control driver 31, so as to completely block the first temperature-measuring viewing angle of the first non-contacting temperature sensing module 4 and the second temperature-measuring viewing angle of the second non-contacting temperature sensing module 5 by the black substance B of the movable shutter structure 32 (step S102); then, referring to FIG. 1, FIG. 3 and FIG. 8, measuring the predetermined heating temperature that is generated by the black substance B of the movable shutter structure 32 by the second non-contacting temperature sensing module 5 at the second temperature-measuring viewing angle so as to obtain black body temperature information B100 of the black substance B (step S104); afterward, referring to FIG. 1, FIG. 3 and FIG. 8, calibrating (or correcting) the first non-contacting temperature sensing module 4 according to the black body temperature information B100 that is obtained by the second non-contacting temperature sensing module 5 (step S106).

For example, referring to FIG. 1, FIG. 5 and FIG. 6, after the step S106 of calibrating the first non-contacting temperature sensing module 4 according to the black body temperature information B100 that is obtained by the second non-contacting temperature sensing module 5, the temperature calibration method further includes: firstly, referring to FIG. 5 and FIG. 6, moving the movable shutter structure 32 to a second position (such as the position of the movable shutter structure 32 as shown in FIG. 5 and FIG. 6) by driving of the electric control driver 31, so as to completely expose the first temperature-measuring viewing angle of the first non-contacting temperature sensing module 4 and the second temperature-measuring viewing angle of the second non-contacting temperature sensing module 5 by the black substance B of the movable shutter structure 32; then, referring to FIG. 1 and FIG. 5, measuring an object temperature of an object T by the first non-contacting temperature sensing module 4 at the first temperature-measuring viewing angle so as to obtain object temperature information T100 of the object T. However, the aforementioned description is merely an example, and is not meant to limit the scope of the present disclosure.

Second Embodiment

Referring to FIG. 9 to FIG. 12, a second embodiment of the present disclosure provides a temperature measuring device D having a temperature calibration function, which includes a device main body 1, a signal control module 2, a first non-contacting temperature sensing module 4, and a second non-contacting temperature sensing module 5. Comparing FIG. 9 with FIG. 1, comparing FIG. 10 with FIG. 3, comparing FIG. 11 with FIG. 5, and comparing FIG. 12 with FIG. 7, the main difference between the second embodiment and the first embodiment is as follows: a movable shutter module 3 can be omitted in the temperature measuring device D of the second embodiment, and the second non-contacting temperature sensing module 5 can be configured for measuring a predetermined heating temperature generated by a black substance B (such as an outside black body) so as to obtain black body temperature information B100 of the black substance B. Therefore, after the black body temperature information B100 of the black substance B is obtained by the second non-contacting temperature sensing module 5, the first non-contacting temperature sensing module 4 can be calibrated according to the black body temperature information B100 that is obtained by the second non-contacting temperature sensing module 5.

Figure 9:
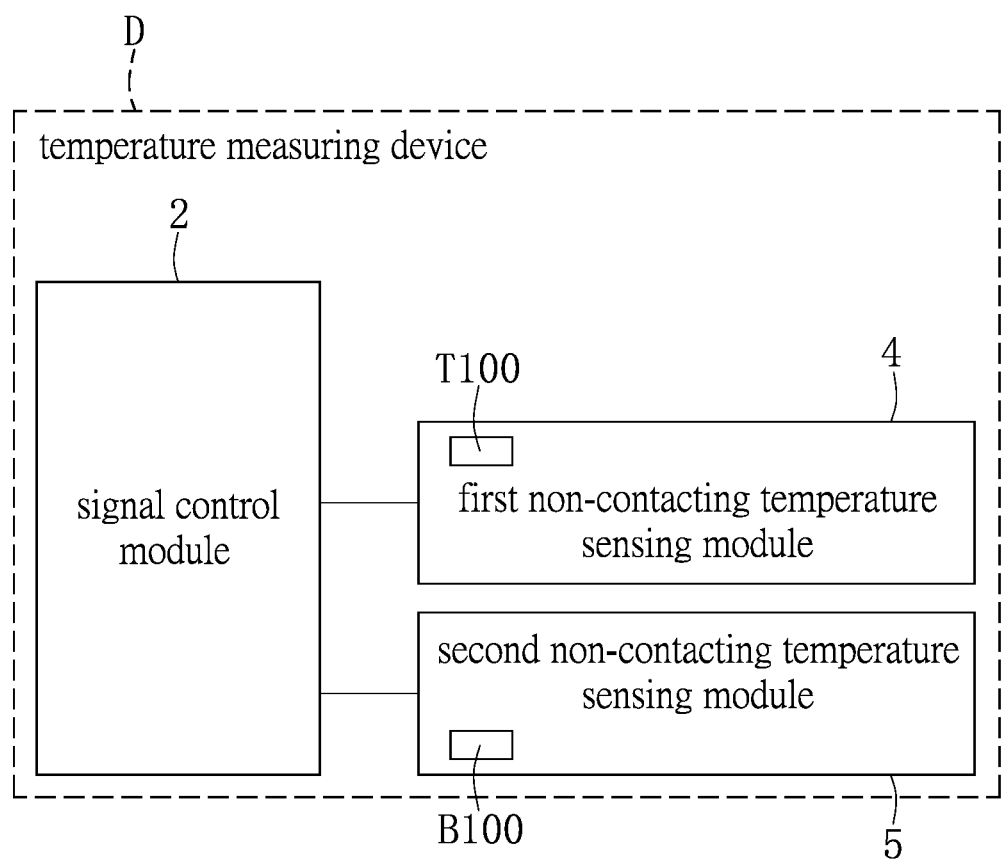
FIG. 9 is a functional block diagram of the temperature measuring device according to a second embodiment of the present disclosure.
Figure 10:
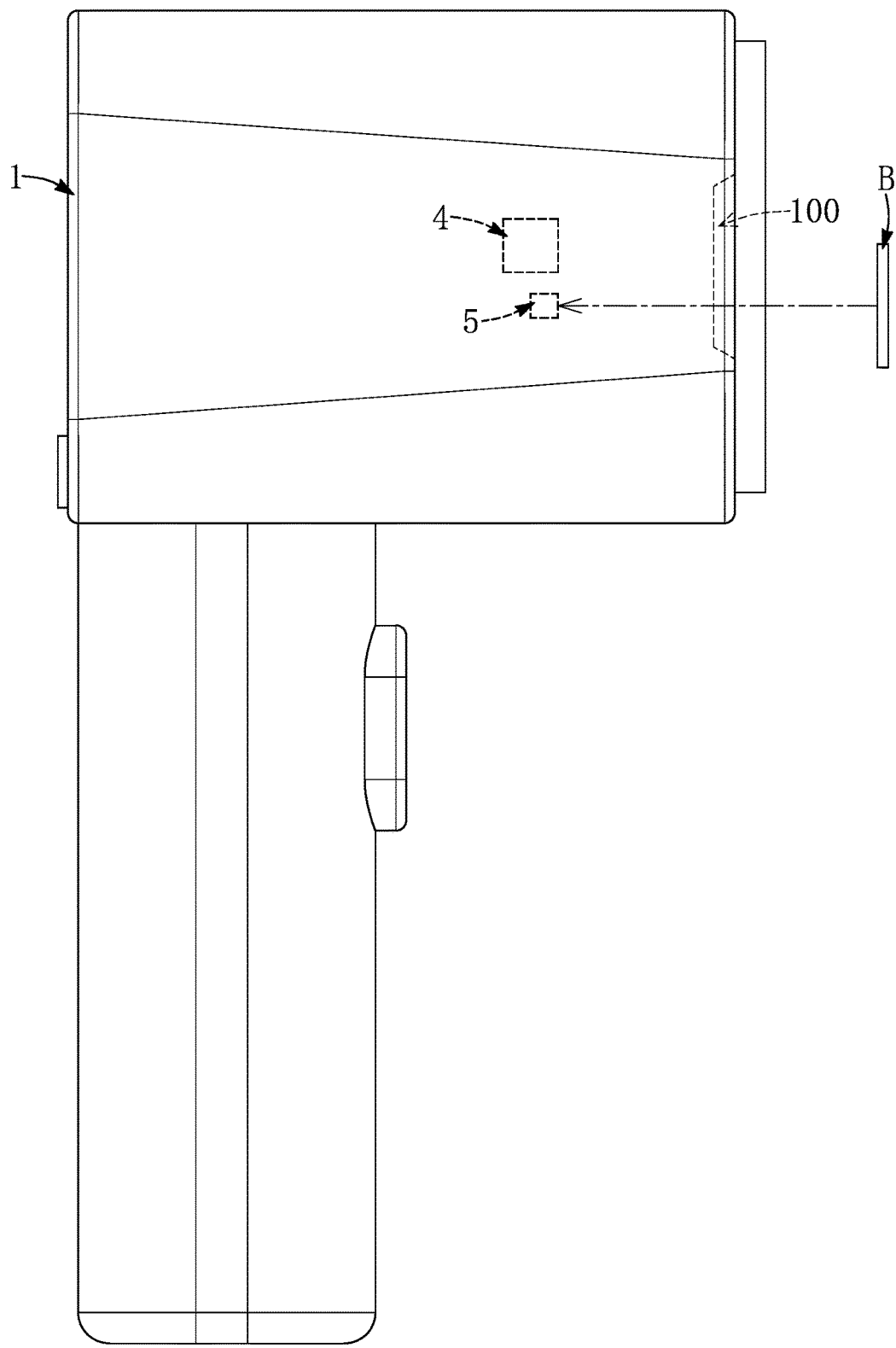
FIG. 10 is a schematic side view of a movable shutter structure of the temperature measuring device being moved to a first position according to the second embodiment of the present disclosure.
Figure 11:
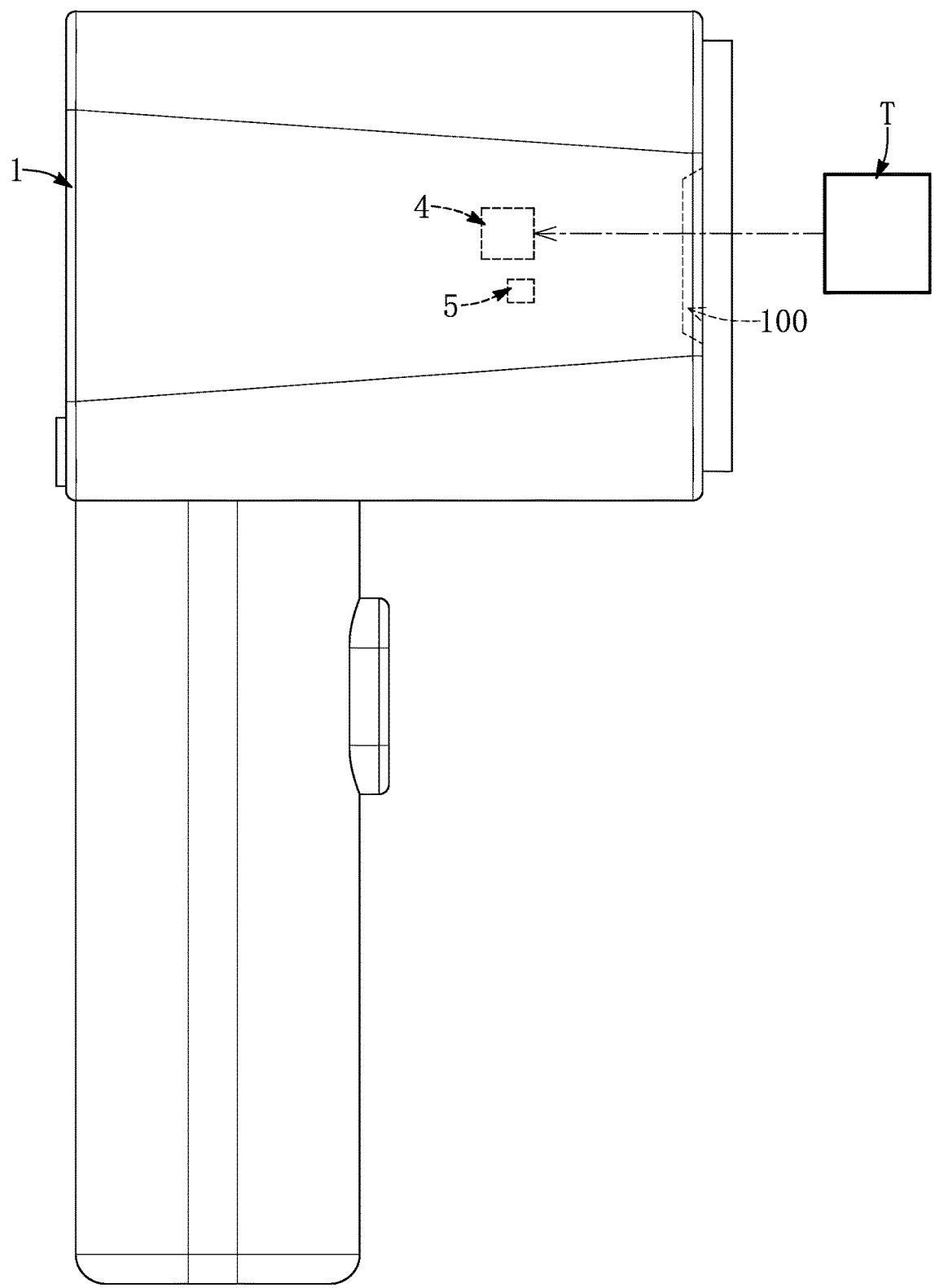
FIG. 11 is a schematic side view of the movable shutter structure of the temperature measuring device being moved to a second position according to the second embodiment of the present disclosure.

More particularly, referring to FIG. 9 to FIG. 11, the object temperature of the object T can be measured by the first non-contacting temperature sensing module 4 in a first temperature-measuring viewing angle so as to obtain the object temperature information T100 of the object T (as shown in FIG. 11), and the predetermined heating temperature generated by the black substance B can be measured by the second non-contacting temperature sensing module 5 at the second temperature-measuring viewing angle so as to obtain the black body temperature information B100 of the black substance B (as shown in FIG. 10).

Figure 12:
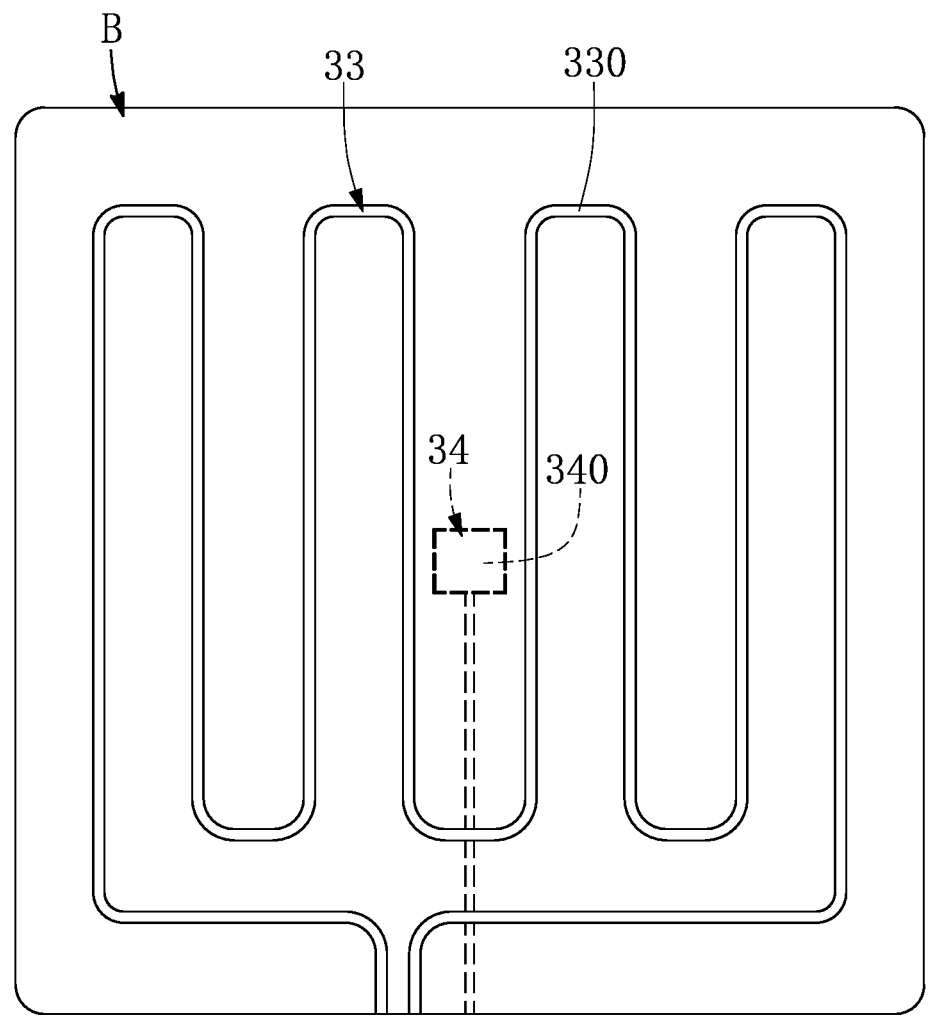
FIG. 12 is a schematic view of a black substance, an electric control heater and a contact temperature sensor of the temperature measuring device according to the second embodiment of the present disclosure.

For example, referring to FIG. 10 and FIG. 12, the black substance B is disposed outside of the device main body 1. In addition, the black substance B can be heated by an electric control heater 33, and the electric control heater 33 includes a heating coil 330 for directly contacting (or non-directly contacting) and heating the black substance B. Moreover, the black substance B can be measured by a contact temperature sensor 34, and the contact temperature sensor 34 includes a thermistor 340 for directly contacting (or non-directly contacting) and measuring the black substance B so as to obtain the predetermined heating temperature generated by the black substance B. However, the aforementioned description is merely an example, and is not meant to limit the scope of the present disclosure.

Figure 13:
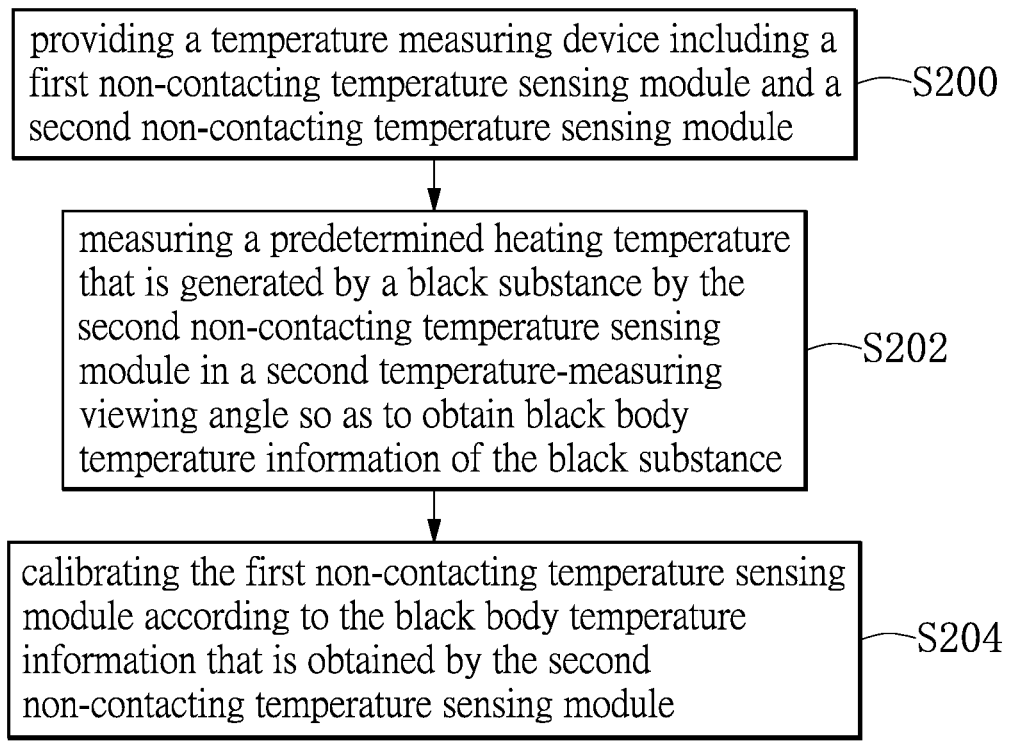
FIG. 13 is a flowchart of a temperature calibration method according to the second embodiment of the present disclosure.

It should be noted that, referring to FIG. 9 to FIG. 13, the second embodiment of the present disclosure further provides a temperature calibration method, which includes: firstly, referring to FIG. 9 and FIG. 13, providing a temperature measuring device D, in which the temperature measuring device D includes a first non-contacting temperature sensing module 4 having a first temperature-measuring viewing angle, and a second non-contacting temperature sensing module 5 having a second temperature-measuring viewing angle (step S200); next, referring to FIG. 9, FIG. 10 and FIG. 13, measuring a predetermined heating temperature that is generated by a black substance B by the second non-contacting temperature sensing module 5 at the second temperature-measuring viewing angle so as to obtain black body temperature information B100 of the black substance B (step S202); then, referring to FIG. 9, FIG. 10 and FIG. 13, calibrating the first non-contacting temperature sensing module 4 according to the black body temperature information B100 that is obtained by the second non-contacting temperature sensing module 5 (step S204).

For example, referring to FIG. 9 and FIG. 11, after the step S204 of calibrating the first non-contacting temperature sensing module 4 according to the black body temperature information B100 that is obtained by the second non-contacting temperature sensing module 5, the temperature calibration method further includes measuring an object temperature of an object T by the first non-contacting temperature sensing module 4 at the first temperature-measuring viewing angle so as to obtain object temperature information T100 of the object T. However, the aforementioned description is merely an example, and is not meant to limit the scope of the present disclosure.

Third Embodiment

Figure 14:
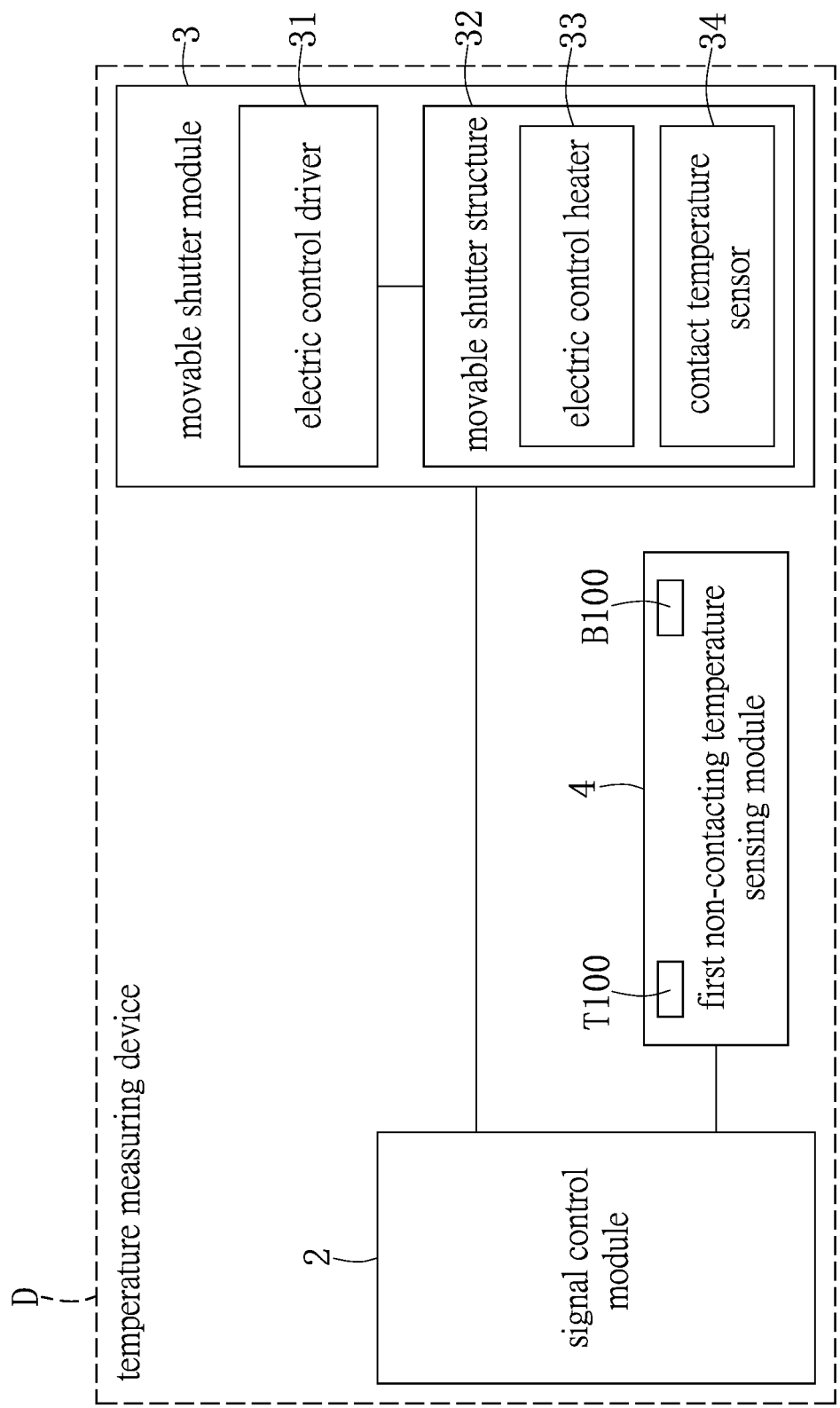
FIG. 14 is a functional block diagram of a temperature measuring device according to a third embodiment of the present disclosure.
Figure 15:
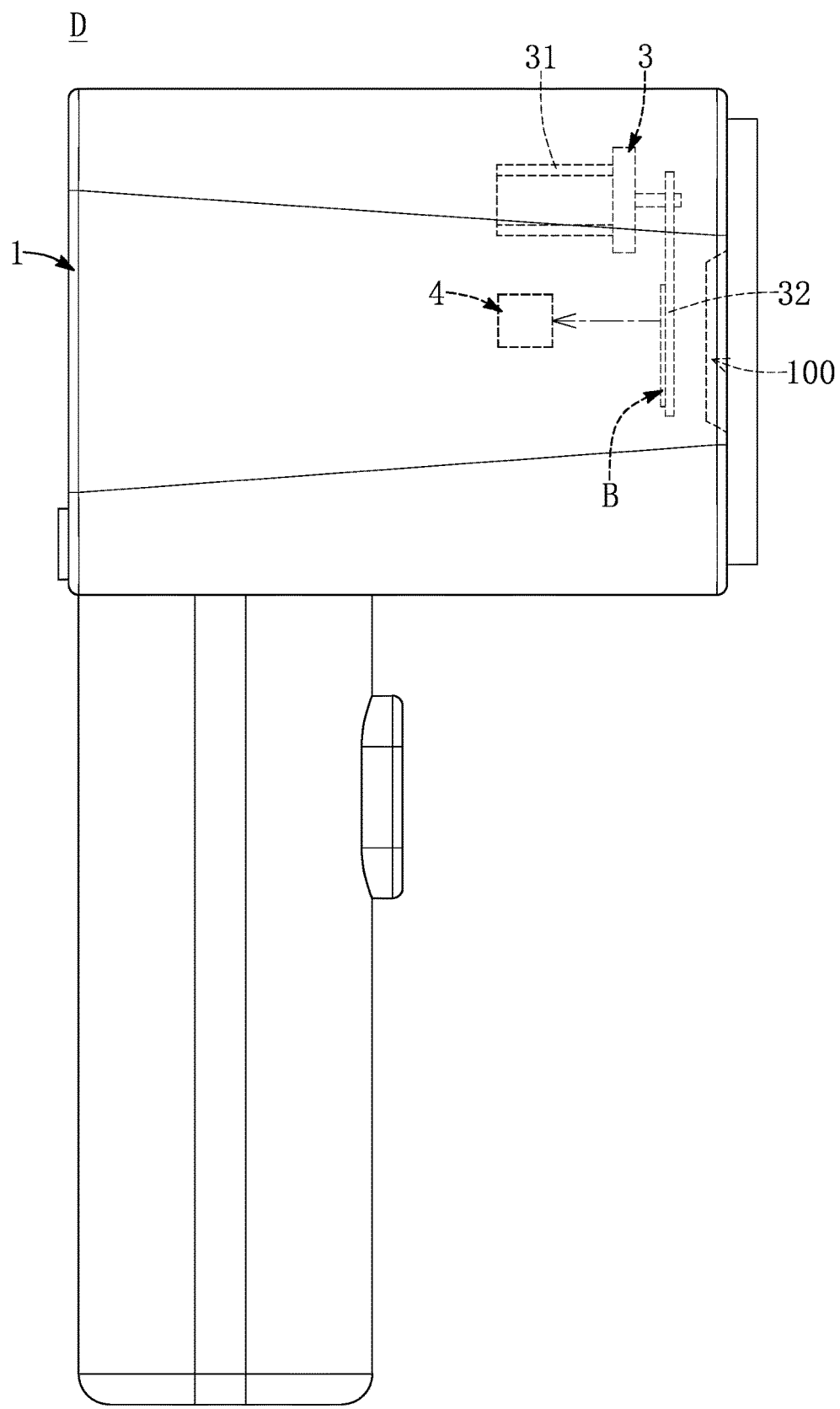
FIG. 15 is a schematic side view of the movable shutter structure of the temperature measuring device being moved to a first position according to the third embodiment of the present disclosure.
Figure 16:
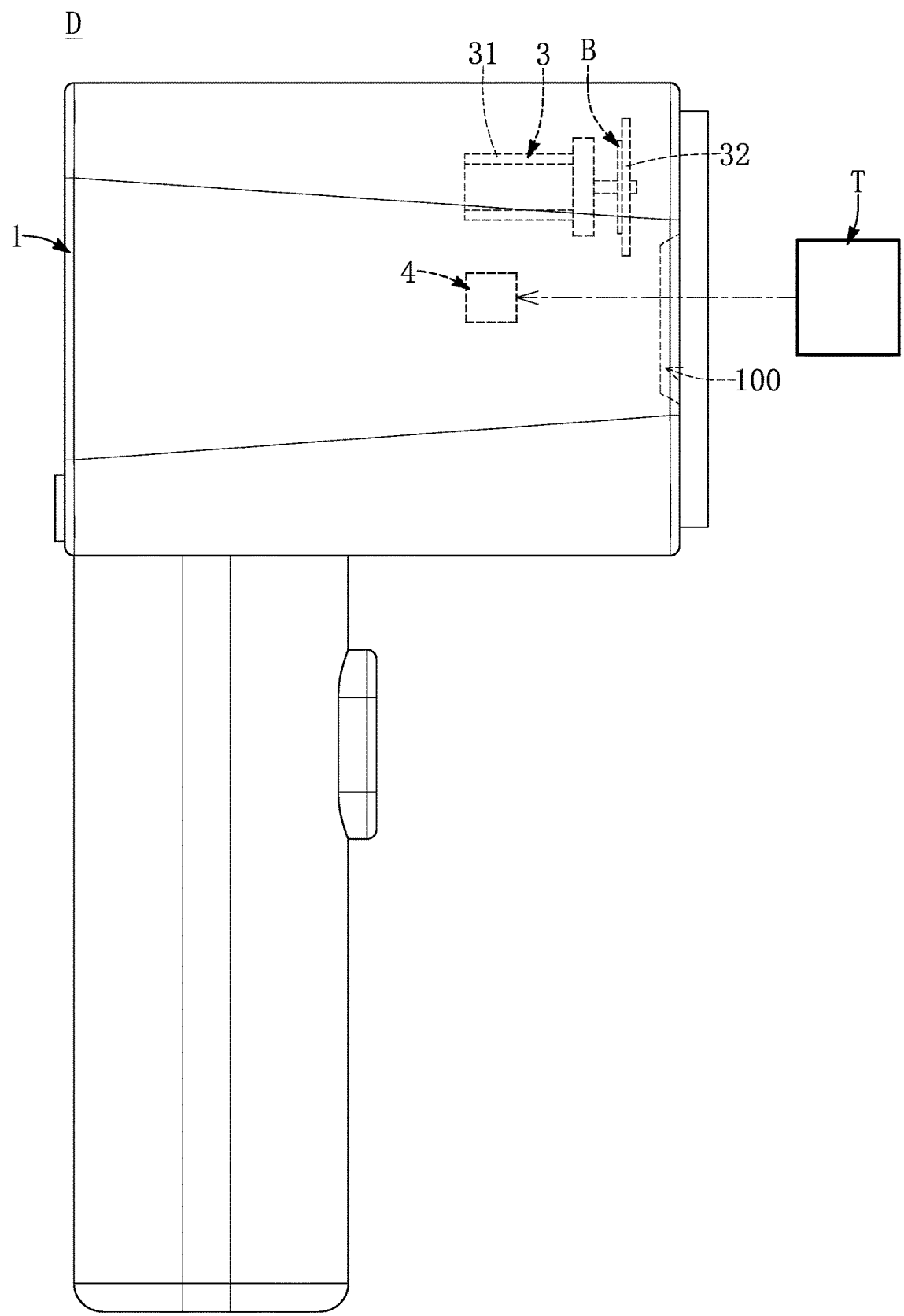
FIG. 16 is a schematic side view of the movable shutter structure of the temperature measuring device being moved to a second position according to the third embodiment of the present disclosure.

Referring to FIG. 14 to FIG. 16, a third embodiment of the present disclosure provides a temperature measuring device D having a temperature calibration function, which includes a device main body 1, a signal control module 2, a movable shutter module 3, and a first non-contacting temperature sensing module 4. Comparing FIG. 14 with FIG. 1, comparing FIG. 15 with FIG. 3, and comparing FIG. 16 with FIG. 5, the main difference between the third embodiment and the first embodiment is as follows: a second non-contacting temperature sensing module 5 can be omitted in the temperature measuring device D of the third embodiment, and the first non-contacting temperature sensing module 4 can be configured for measuring the predetermined heating temperature generated by the black substance B of the movable shutter structure 32 so as to obtain black body temperature information B100 of the black substance B, or for measuring an object temperature of an object T so as to obtain object temperature information T100 of the object T. Therefore, after the black body temperature information B100 of the black substance B is obtained by the first non-contacting temperature sensing module 4, the first non-contacting temperature sensing module 4 can be calibrated according to the black body temperature information B100 that is obtained by the first non-contacting temperature sensing module 4.

For example, referring to FIG. 14 and FIG. 15, when the movable shutter structure 32 is driven by the electric control driver 31 to move to a first position (such as the position of the movable shutter structure 32 as shown in FIG. 15), a first temperature-measuring viewing angle of the first non-contacting temperature sensing module 4 can be completely blocked by the black substance B of the movable shutter structure 32, so that the predetermined heating temperature generated by the black substance B of the movable shutter structure 32 can be measured by the first non-contacting temperature sensing module 4 at the first temperature-measuring viewing angle so as to obtain the black body temperature information B100 of the black substance B. Hence, the black body temperature information B100 obtained by the first non-contacting temperature sensing module 4 can be configured for calibrating the first non-contacting temperature sensing module 4. However, the aforementioned description is merely an example, and is not meant to limit the scope of the present disclosure.

For example, referring to FIG. 14 and FIG. 16, when the movable shutter structure 32 is driven by the electric control driver 31 to move to a second position (such as the position of the movable shutter structure 32 as shown in FIG. 16), the first temperature-measuring viewing angle of the first non-contacting temperature sensing module 4 can be completely exposed by the black substance B of the movable shutter structure 32, so that the object temperature of the object T can be measured by the first non-contacting temperature sensing module 4 at the first temperature-measuring viewing angle so as to obtain the object temperature information T100 of the object T. However, the aforementioned description is merely an example, and is not meant to limit the scope of the present disclosure.

Figure 17:
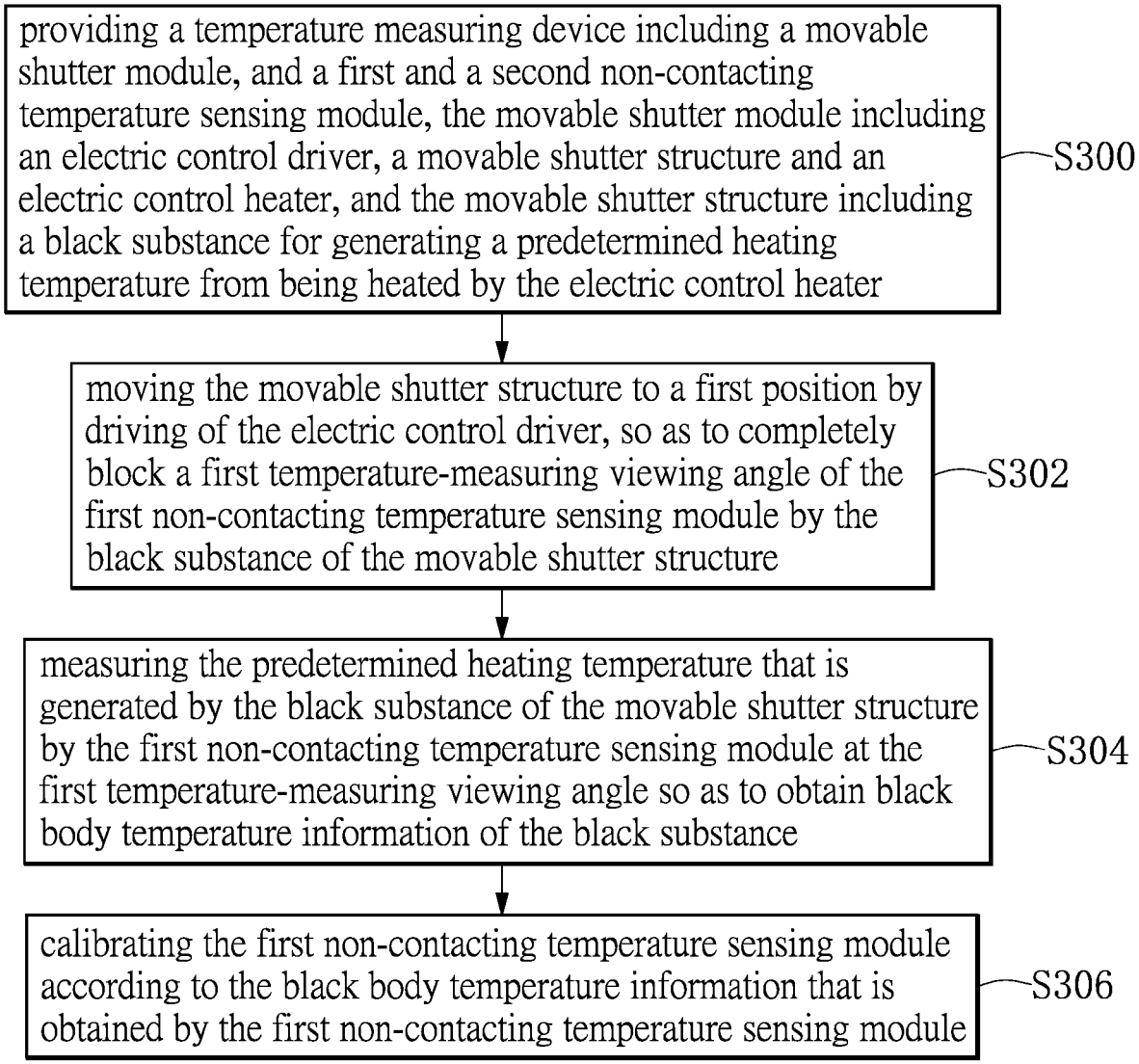
FIG. 17 is a flowchart of a temperature calibration method according to the third embodiment of the present disclosure.

It should be noted that, referring to FIG. 14 to FIG. 17, the third embodiment of the present disclosure further provides a temperature calibration method, which includes: firstly, referring to FIG. 14 and FIG. 17, providing a temperature measuring device D, in which the temperature measuring device D includes a movable shutter module 3, and a first non-contacting temperature sensing module 4 having a first temperature-measuring viewing angle, the movable shutter module 3 includes an electric control driver 31, a movable shutter structure 32 connected to the electric control driver 31, and an electric control heater 33 disposed on the movable shutter structure 32, and the movable shutter structure 32 includes a black substance B for generating a predetermined heating temperature from being heated by the electric control heater 33 (step S300); next, referring to FIG. 15 and FIG. 17, moving the movable shutter structure 32 to a first position (such as the position of the movable shutter structure 32 as shown in FIG. 15) by driving of the electric control driver 31, so as to completely block the first temperature-measuring viewing angle of the first non-contacting temperature sensing module 4 by the black substance B of the movable shutter structure 32 (step S302); then, referring to FIG. 14, FIG. 15 and FIG. 17, measuring the predetermined heating temperature that is generated by the black substance B of the movable shutter structure 32 by the first non-contacting temperature sensing module 4 at the first temperature-measuring viewing angle so as to obtain black body temperature information B100 of the black substance B (step S304); afterward, referring to FIG. 14 and FIG. 17, calibrating the first non-contacting temperature sensing module 4 according to the black body temperature information B100 that is obtained by the first non-contacting temperature sensing module 4 (step S306).

For example, referring to FIG. 14 and FIG. 16, after the step S306 of calibrating the first non-contacting temperature sensing module 4 according to the black body temperature information B100 that is obtained by the first non-contacting temperature sensing module 4, the temperature calibration method further includes: firstly, moving the movable shutter structure 32 to a second position (such as the position of the movable shutter structure 32 as shown in FIG. 16) by driving of the electric control driver 31, so as to completely expose the first temperature-measuring viewing angle of the first non-contacting temperature sensing module 4 by the black substance B of the movable shutter structure 32; and then measuring an object temperature of an object T by the first non-contacting temperature sensing module 4 at the first temperature-measuring viewing angle so as to obtain object temperature information T100 of the object T. However, the aforementioned description is merely an example, and is not meant to limit the scope of the present disclosure.

Beneficial Effects of the Embodiments

In conclusion, in the temperature measuring device D provided by the present disclosure, by virtue of "moving the movable shutter structure 32 to a first position by driving of the electric control driver 31, so as to completely block the first temperature-measuring viewing angle of the first non-contacting temperature sensing module 4 and the second temperature-measuring viewing angle of the second non-contacting temperature sensing module 5 by the black substance B of the movable shutter structure 32" and "measuring the predetermined heating temperature that is generated by the black substance B of the movable shutter structure 32 by the second non-contacting temperature sensing module 5 at the second temperature-measuring viewing angle so as to obtain black body temperature information B100 of the black substance B", the first non-contacting temperature sensing module 4 can be calibrated according to the black body temperature information B100 that is obtained by the second non-contacting temperature sensing module 5.

Moreover, in the temperature measuring device D provided by the present disclosure, by virtue of "measuring a predetermined heating temperature that is generated by a black substance B by the second non-contacting temperature sensing module 5 at the second temperature-measuring viewing angle so as to obtain black body temperature information B100 of the black substance B", the first non-contacting temperature sensing module 4 can be calibrated according to the black body temperature information B100 that is obtained by the second non-contacting temperature sensing module 5.

Furthermore, in the temperature measuring device D provided by the present disclosure, by virtue of "moving the movable shutter structure 32 to a first position by driving of the electric control driver 31, so as to completely block the first temperature-measuring viewing angle of the first non-contacting temperature sensing module 4 by the black substance B of the movable shutter structure 32" and "measuring the predetermined heating temperature that is generated by the black substance B of the movable shutter structure 32 by the first non-contacting temperature sensing module 4 at the first temperature-measuring viewing angle so as to obtain black body temperature information B100 of the black substance B", the first non-contacting temperature sensing module 4 can be calibrated according to the black body temperature information B100 that is obtained by the first non-contacting temperature sensing module 4.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A temperature calibration method, comprising:
providing a temperature measuring device, wherein the temperature measuring device includes a movable shutter module, a first non-contacting temperature sensing module having a first temperature-measuring viewing angle, a second non-contacting temperature sensing module having a second temperature-measuring viewing angle, the movable shutter module includes an electric control driver, a movable shutter structure connected to the electric control driver, and an electric control heater disposed on the movable shutter structure, and the movable shutter structure includes a black substance for generating a predetermined heating temperature from being heated by the electric control heater;
moving the movable shutter structure to a first position by driving of the electric control driver, so as to completely block the first temperature-measuring viewing angle of the first non-contacting temperature sensing module and the second temperature-measuring viewing angle of the second non-contacting temperature sensing module by the black substance of the movable shutter structure;
measuring the predetermined heating temperature that is generated by the black substance of the movable shutter structure by the second non-contacting temperature sensing module at the second temperature-measuring viewing angle so as to obtain black body temperature information of the black substance; and
calibrating the first non-contacting temperature sensing module according to the black body temperature information that is obtained by the second non-contacting temperature sensing module.

2. The temperature calibration method according to claim 1,
wherein, after the step of calibrating the first non-contacting temperature sensing module according to the black body temperature information that is obtained by the second non-contacting temperature sensing module, the temperature calibration method further comprises:
moving the movable shutter structure to a second position by driving of the electric control driver, so as to completely expose the first temperature-measuring viewing angle of the first non-contacting temperature sensing module and the second temperature-measuring viewing angle of the second non-contacting temperature sensing module by the black substance of the movable shutter structure; and measuring an object temperature of an object by the first non-contacting temperature sensing module at the first temperature-measuring viewing angle so as to obtain object temperature information of the object.

3. The temperature calibration method according to claim 1, wherein the temperature measuring device includes a device main body and a signal control module disposed inside the device main body;

wherein the device main body has a measurement opening, and the movable shutter structure is rotated by driving of the electric control driver so as to block or expose the measurement opening of the device main body;

wherein the electric control heater includes a heating coil electrically connected to the signal control module, and the heating coil is disposed on the movable shutter structure for contacting and heating the black substance;

wherein the movable shutter module includes a contact temperature sensor disposed on the movable shutter structure, the contact temperature sensor includes a thermistor electrically connected to the signal control module, and the thermistor is disposed on the movable shutter structure for contacting and measuring the black substance so as to obtain the predetermined heating temperature generated by the black substance;

wherein, when the black substance of the movable shutter structure is heated by the electric control heater for generating the predetermined heating temperature, a radiant temperature value that is obtained by using the second non-contacting temperature sensing module to measure the predetermined heating temperature generated by the black substance is greater than or equal to another radiant temperature value that is obtained by using the first non-contacting temperature sensing module to measure the predetermined heating temperature generated by the black substance;

wherein the first non-contacting temperature sensing module includes a microbolometer for providing a thermal energy distribution image, and the second non-contacting temperature sensing module includes a thermopile sensor for increasing a temperature measurement precision and a temperature measurement stability.

4. A temperature calibration method, comprising:

providing a temperature measuring device, wherein the temperature measuring device includes a first non-contacting temperature sensing module having a first temperature-measuring viewing angle, and a second non-contacting temperature sensing module having a second temperature-measuring viewing angle;

measuring a predetermined heating temperature that is generated by a black substance by the second non-contacting temperature sensing module at the second temperature-measuring viewing angle so as to obtain black body temperature information of the black substance; and calibrating the first non-contacting temperature sensing module according to the black body temperature information that is obtained by the second non-contacting temperature sensing module.

5. The temperature calibration method according to claim 4, wherein, after the step of calibrating the first non-contacting temperature sensing module according to the black body temperature information that is obtained by the second non-contacting temperature sensing module, the temperature calibration method further comprises:

measuring an object temperature of an object by the first non-contacting temperature sensing module at the first temperature-measuring viewing angle so as to obtain object temperature information of the object.

6. The temperature calibration method according to claim 4, wherein the black substance is disposed outside of the device main body, the black substance is heated by an electric control heater, and the electric control heater includes a heating coil for contacting and heating the black substance;

wherein the black substance is measured by a contact temperature sensor, and the contact temperature sensor includes a thermistor for contacting and measuring the black substance so as to obtain the predetermined heating temperature generated by the black substance;

wherein, when the black substance is heated by the electric control heater for generating the predetermined heating temperature, a radiant temperature value that is obtained by using the second non-contacting temperature sensing module to measure the predetermined heating temperature generated by the black substance is greater than or equal to another radiant temperature value that is obtained by using the first non-contacting temperature sensing module to measure the predetermined heating temperature generated by the black substance;

wherein the first non-contacting temperature sensing module includes a microbolometer for providing a thermal energy distribution image, and the second non-contacting temperature sensing module includes a thermopile sensor for increasing a temperature measurement precision and a temperature measurement stability.

7. A temperature calibration method, comprising:

providing a temperature measuring device, wherein the temperature measuring device includes a movable shutter module, and a first non-contacting temperature sensing module having a first temperature-measuring viewing angle, the movable shutter module includes an electric control driver, a movable shutter structure connected to the electric control driver, and an electric control heater disposed on the movable shutter structure, and the movable shutter structure includes a black substance for generating a predetermined heating temperature from being heated by the electric control heater;

moving the movable shutter structure to a first position by driving of the electric control driver, so as to completely block the first temperature-measuring viewing angle of the first non-contacting temperature sensing module by the black substance of the movable shutter structure;

measuring the predetermined heating temperature that is generated by the black substance of the movable shutter structure by the first non-contacting temperature sensing module at the first temperature-measuring viewing angle so as to obtain black body temperature information of the black substance; and calibrating the first non-contacting temperature sensing module according to the black body temperature information that is obtained by the first non-contacting temperature sensing module.

8. The temperature calibration method according to claim 7, wherein, after the step of calibrating the first non-contacting temperature sensing module according to the black body temperature information that is obtained by the first non-contacting temperature sensing module, the temperature calibration method further comprises:

moving the movable shutter structure to a second position by driving of the electric control driver, so as to completely expose the first temperature-measuring viewing angle of the first non-contacting temperature sensing module by the black substance of the movable shutter structure; and measuring an object temperature of an object by the first non-contacting temperature sensing module at the first temperature-measuring viewing angle so as to obtain object temperature information of the object.

9. The temperature calibration method according to claim 7, wherein the temperature measuring device includes a device main body and a signal control module disposed inside the device main body;

wherein the device main body has a measurement opening, and the movable shutter structure is rotated by driving of the electric control driver so as to block or expose the measurement opening of the device main body;

wherein the electric control heater includes a heating coil electrically connected to the signal control module, and the heating coil is disposed on the movable shutter structure for contacting and heating the black substance;

wherein the movable shutter module includes a contact temperature sensor disposed on the movable shutter structure, the contact temperature sensor includes a thermistor electrically connected to the signal control module, and the thermistor is disposed on the movable shutter structure for contacting and measuring the black substance so as to obtain the predetermined heating temperature generated by the black substance;

wherein the first non-contacting temperature sensing module includes a microbolometer for providing a thermal energy distribution image.

* * * * *